US012750685B2

(12) United States Patent
Kiilerich Pratas et al.

(10) Patent No.: US 12,750,685 B2
(45) Date of Patent: Sep. 29, 2026

(54) SIDELINK TRANSMISSION ENHANCEMENT

(71) Applicant: Nokia Technologies Oy, Espoo (FI)

(72) Inventors: Nuno Manuel Kiilerich Pratas, Aalborg (DK); Tao Tao, Shanghai (CN); Ling Yu, Espoo (FI); Vinh Van Phan, Oulu (FI); Yong Liu, Shanghai (CN); Naizheng Zheng, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 351 days.

(21) Appl. No.: 18/560,561

(22) PCT Filed: May 19, 2021

(86) PCT No.: PCT/CN2021/094711
§ 371 (c)(1),
(2) Date: Nov. 13, 2023

(87) PCT Pub. No.: WO2022/241692
PCT Pub. Date: Nov. 24, 2022

(65) Prior Publication Data
US 2024/0259823 A1 Aug. 1, 2024

(51) Int. Cl.
*H04W 16/14* (2009.01)
*H04W 74/00* (2009.01)

(52) U.S. Cl.
CPC ......... *H04W 16/14* (2013.01); *H04W 74/002* (2013.01)

(58) Field of Classification Search
CPC ... H04W 16/14; H04W 74/002; H04W 72/40; H04W 74/0808
See application file for complete search history.

(56) References Cited

U.S. PATENT DOCUMENTS 10,932,293 B2 2/2021 Do et al.
2017/0289869 A1 10/2017 Nogami et al.
(Continued)

FOREIGN PATENT DOCUMENTS

CN 111587605 A 8/2020
EP 3437237 B1 1/2020
(Continued)

OTHER PUBLICATIONS

Extended European Search Report received for corresponding European Patent Application No. 21940148.6, dated Jan. 7, 2025, 9 pages total.
(Continued)

*Primary Examiner* — Nizam U Ahmed
(74) *Attorney, Agent, or Firm* — Carter, DeLuca & Farrell LLP

(57) ABSTRACT

Example embodiments of the present disclosure relate to sidelink (SL) transmission enhancement. A first device determines a channel occupancy time (COT) to be shared by the first device and at least one second device for transmissions on a shared radio frequency band; selects a first time slot during the COT for a transmission; and performs the transmission in the first time slot by extending the transmission to a first guard period of the first time slot or to a second guard period of a second time slot prior to the first time slot during the COT. By doing so, a channel access procedure requiring a smaller time gap between transmissions can be selected and performed, which can thus improve the flexibility of channel access procedures for SL transmission in the shared frequency band.

1 Claim, 10 Drawing Sheets

(56) References Cited

U.S. PATENT DOCUMENTS

| | | | |
|---|---|---|---|
| 2019/0208544 A1 | 7/2019 | Jia et al. | |
| 2020/0037354 A1 | 1/2020 | Li et al. | |
| 2020/0205195 A1 | 6/2020 | Sun et al. | |
| 2020/0305191 A1 | 9/2020 | Moon et al. | |
| 2020/0383095 A1 | 12/2020 | Moon et al. | |
| 2024/0008085 A1* | 1/2024 | Stefanatos | H04L 1/1861 |
| 2025/0185066 A1* | 6/2025 | Lin | H04L 27/2605 |

FOREIGN PATENT DOCUMENTS

| | | |
|---|---|---|
| WO | 2020/144399 A1 | 7/2020 |
| WO | 2020/259083 A1 | 12/2020 |

OTHER PUBLICATIONS

"IEEE 802.11", Wikipedia, Retrieved on Dec. 1, 2023, Webpage available at : https://en.wikipedia.org/wiki/IEEE_802.11.

"3rd Generation Partnership Project; Technical Specification Group Radio Access Network; Physical layer procedures for shared spectrum channel access (Release 16)", 3GPP TS 37.213, V16.5.0, Mar. 2021, pp. 1-27.

"Channel access and co-existence for NR-U operation", 3GPP TSG RAN WG1 Meeting #94, R1-1808819, Agenda: 7.2.2.4.1, Nokia, Aug. 20-24, 2018, 4 pages.

"3rd Generation Partnership Project; Technical Specification Group Radio Access Network; NR; Physical layer procedures for data (Release 16)", 3GPP TS 38.214, V16.5.0, Mar. 2021, pp. 1-171.

International Search Report and Written Opinion received for corresponding Patent Cooperation Treaty Application No. PCT/CN2021/094711, dated Feb. 17, 2022, 10 pages.

"Channel access mechanism for NR—unlicensed", 3GPP TSG RAN WG1 Meeting #99, R1-1912197, Agenda: 7.2.2.2.1, Intel Corporation, Nov. 18-22, 2019, 30 pages.

* cited by examiner

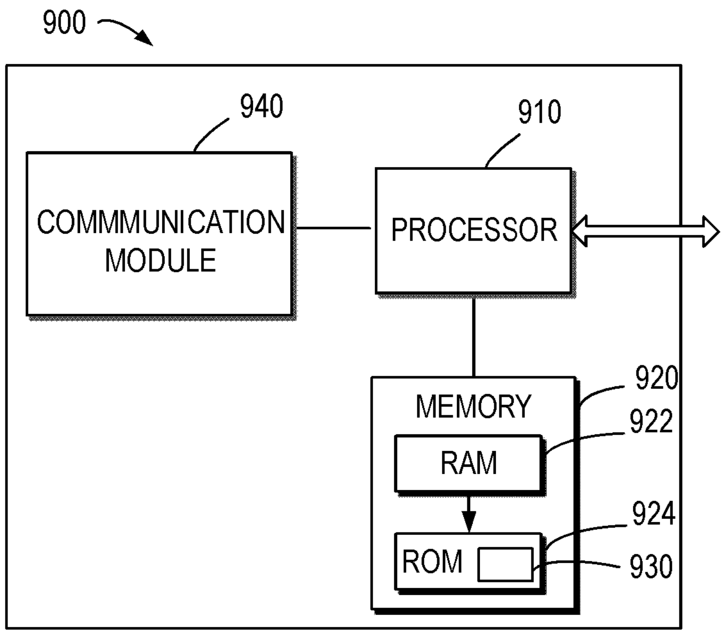
Fig. 9
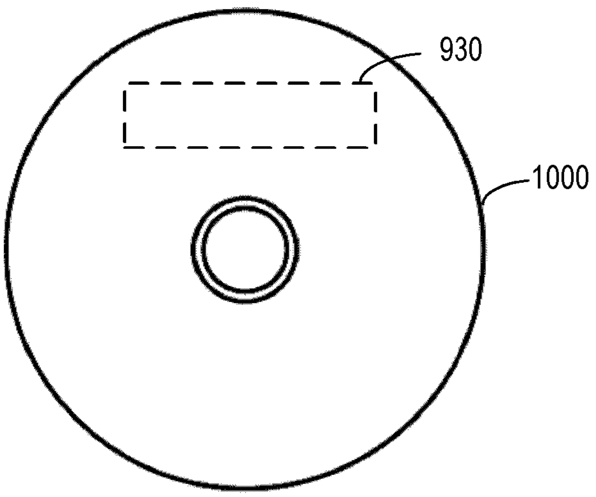
Fig, 10

SIDELINK TRANSMISSION ENHANCEMENT

RELATED APPLICATION

This application was originally filed as PCT Application No. PCT/CN2021/094711 on 19 May 2021, which is incorporated herein by reference in its entirety.

FIELD

Embodiments of the present disclosure generally relate to the field of telecommunication and in particular, to methods, devices, apparatuses and computer readable storage medium for sidelink (SL) transmission enhancement.

BACKGROUND

With the rapid development of the communication technology, communication systems can support various types of service applications for terminal devices, such as transmissions between terminal devices. In recent communication technologies, it has been proposed to use SL connections for transmissions between terminal devices. SL connections are communication connections established between different terminal devices. Works are ongoing to introduce enhancements to SL transmissions with channel access procedures, such as a Listen-before-Talk (LBT) mechanism, to improve their performance in unlicensed spectrum.

SUMMARY

The scope of protection sought for various embodiments of the invention is set out by the independent claims. The embodiments/examples and features, if any, described in this specification that do not fall under the scope of the independent claims are to be interpreted as examples useful for understanding various embodiments of the invention." Please note that the term "embodiments" or "examples" should be adapted accordingly to the terminology used in the application, i.e. if the term "examples" is used, then the statement should talk of "examples" accordingly, or if the term "embodiments" is used, then the statement should talk of "embodiments" accordingly.

In general, example embodiments of the present disclosure provide a solution for SL transmission enhancement. Embodiments that do not fall under the scope of the claims, if any, are to be interpreted as examples useful for understanding various embodiments of the disclosure.

In a first aspect, there is provided a first device. The first device comprises at least one processor; and at least one memory including computer program code; where the at least one memory and the computer program code are configured to, with the at least one processor, cause the first device to determine a channel occupancy time to be shared by the first device and at least one second device for transmissions on a shared radio frequency band; select a first time slot during the channel occupancy time for a transmission; and perform the transmission in the first time slot by extending the transmission to a first guard period of the first time slot or to a second guard period of a second time slot prior to the first time slot during the channel occupancy time.

In a second aspect, there is provided a method. The method comprises determining, by a first device, a channel occupancy time to be shared by the first device and at least one second device for transmissions on a shared radio frequency band; selecting a first time slot during the channel occupancy time for a transmission; and performing the transmission in the first time slot by extending the transmission to a first guard period of the first time slot or to a second guard period of a second time slot prior to the first time slot during the channel occupancy time.

In a third aspect, there is provided a first apparatus. The first apparatus comprises means for determining a channel occupancy time to be shared by the first apparatus and at least one second apparatus for transmissions on a shared radio frequency band; means for selecting a first time slot during the channel occupancy time for a transmission; and means for performing the transmission in the first time slot by extending the transmission to a first guard period of the first time slot or to a second guard period of a second time slot prior to the first time slot during the channel occupancy time.

In a fourth aspect, there is provided a computer readable medium. The computer readable medium comprises program instructions for causing an apparatus to perform at least the method according to the second aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 9 illustrates a simplified block diagram of an apparatus that is suitable for implementing example embodiments of the present disclosure; and FIG. 10 illustrates a block diagram of an example computer readable medium in accordance with some example embodiments of the present disclosure.

Throughout the drawings, the same or similar reference numerals represent the same or similar element. Throughout the drawings, the same or similar reference numerals represent the same or similar element.

DETAILED DESCRIPTION

Figure 1:
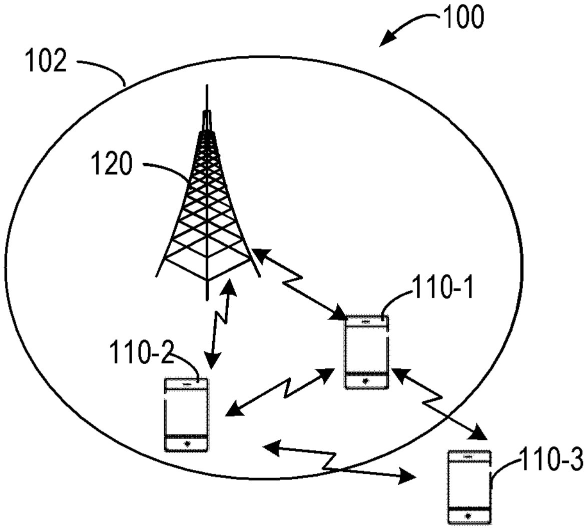
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some example embodiments of the present disclosure. It is noted that example embodiments of the present disclosure are equally applicable to other resources in other domains.

FIG. 1 shows an example communication environment 100 in which example embodiments of the present disclosure can be implemented. In the communication environment 100, a network device 120 has a certain coverage range, which may be called as a serving area or a cell 102. One or more terminal devices may be located within or outside the cell 102. As illustrated, terminal devices 110-1 and 110-2 are located within the cell 102 and thus can communicate with the network device 120. A terminal device 110-3 is located outside the cell 102 and thus is not able to obtain service from the network device 120. For ease of discussion, the terminal devices 110-1, 110-2, and 110-3 are collectively or individually referred to as terminal devices 110 or devices 110.

Different terminal devices 110 may establish communication connections with each other. For example, the terminal devices 110-1 and 110-2 within the cell 102 (in coverage) may establish communication connections with each other. In addition, the terminal device 110-3 outside the cell 102 (out of coverage) may also establish communication connections with the terminal device 110-1 and/or the terminal device 110-2 within the cell 102. In some example embodiments, a terminal device 110 may establish communication connections with a plurality of other terminal devices 110. The communications between the terminal devices 110 may be referred to as sidelink (SL) communications.

During SL communications, different terminal devices 110 may communicate data and control information with each other. A terminal device 110 may communicate data and control information with more than one terminal device 110 if the SL connections are established therebetween. In SL communication, a terminal device 110 performing a transmission is referred to as a transmitting (TX) device (or a transmitter) and a terminal device 110 receiving the transmission is referred to as a receiving (RX) device (or a receiver).

It is to be understood that the number of devices and their connections shown in FIG. 1 are only for the purpose of illustration, without suggesting any limitation. The environment 100 may include any suitable number of devices adapted for implementing embodiments of the present disclosure. Although not shown, it would be appreciated that one or more additional devices may be located in the cell 102, and one or more additional cells may be deployed in the environment 100.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

SL communications may support one or more communication methods including unicast communication, multicast communication, and broadcast communication. SL may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

In some example embodiments, the network device 120 may perform SL resource allocation for the terminal devices 110 (referred to as resource allocation mode 1 hereinafter). The configuration and operation of this mode of SL resource allocation is similar to the one over the Uu interface. For example, if a terminal device 110 intends to transmit data via SL, it may report information about the SL transmission, such as a Buffer Status Report (BSR), to the network device 120. Then the network device 120 may allocate resources for the SL transmission to the terminal device 110.

In some example embodiments, the terminal device 110 may perform autonomously resource selection through a sensing procedure (referred to as resource allocation mode 2 hereinafter). For example, the terminal device 110 may determine, based on the knowledge obtained from sensing (for example, sidelink control information (SCI) via PSFCH), whether resources on the SL are preempted by another terminal device. Then, the terminal device 110 may choose an unoccupied resource for the SL transmission.

Conventionally, if a device intends to perform a transmission on a shared radio frequency band (for example, unlicensed spectrum), the device may need first to perform a channel access procedure on the shared radio frequency band to check whether it is free for the transmission. The channel access procedure may include a Listen before Talk (LBT) procedure. There are several types of channel access procedures, which will be described with reference to FIGS. 2A-2C.

Figure 2A:
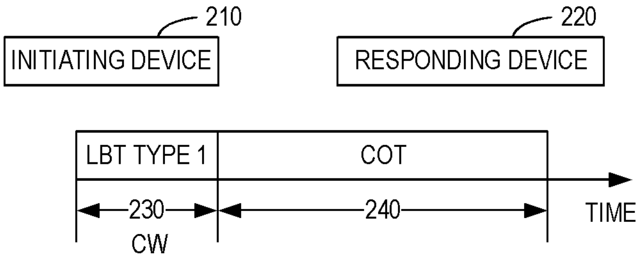
FIGS. 2A-2C illustrate some example of SL transmission with a channel access procedure.

As shown in FIG. 2A, when an initiating device 210 intends to perform a transmission to a responding device 220 using resources on a shared radio frequency band, the initiating device 210 needs to acquire the permission to access the shared radio frequency band for a certain period of time, which is also referred to as the Channel Occupancy Time (COT) 240 by applying a channel access procedure. As used herein, the term "initiating device" may refer to a device that initiates a transmission(s) to one or more other devices and obtains a COT for the transmission(s). As used herein, the term "responding device" may refer to a device to which the initiating device performs the transmission. In some example embodiments, the channel access procedure may be an "extended" LBT procedure (for example, a LBT Type 1 procedure or a Type 1 channel access procedure) where the shared radio frequency band is determined as free for the duration of a Contention Window (CW) 230. After the initiating device 210 successfully completes the LBT Type 1 check after the duration of CW 230, the initiating device 210 may perform a transmission during the COT 240.

Figure 2B:
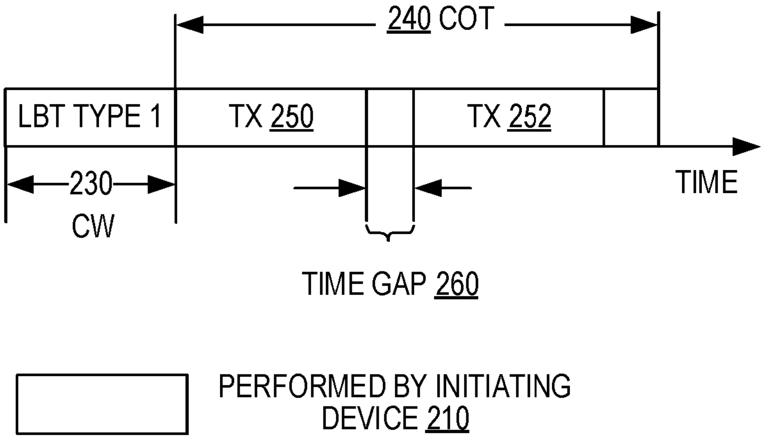

If the initiating device 210 decides to perform a new transmission within the COT 240 after the initial transmission, the initiating device 210 may perform a further channel access procedure within the COT. In this case, the channel access procedure may include a "reduced" LBT procedure (for example, a LBT Type 2 procedure or a Type 2 channel access procedure), through which the initiating device 210 may need to monitor the shared radio frequency band for a smaller period of time as compared with the "extended" LBT procedure (for example, the LBT Type 1 procedure). FIG. 2B shows an example of performing a LBT Type 2 procedure before a new transmission performed by the initiating device 210 within the COT 240.

As shown in FIG. 2B, after completing the LBT Type 1 procedure during the duration of CW 230, the initiating device 210 performs an initial transmission 250. After that, the initiating device 210 may intend to perform a new transmission 252 within the COT 240. As shown in FIG. 2B, the initiating device 210 may need to perform a LBT Type 2 procedure before performing the transmission 252 in order to check that the shared radio frequency band is free for communication.

There are several types of LBT Type 2 procedures that are selectable based on a time gap between two transmissions to be performed within a COT. As an example, the LBT Type 2 procedure may include a LBT Type 2A procedure, a LBT Type 2B procedure and a LBT Type 2C procedure. The channel access procedure to be performed is determined based on a duration of a time gap 260 between the transmissions 250 and 252. For example, if the duration of the time gap 260 is greater than or equal to 25 μs, then the initiating device 210 may perform a LBT Type 2A (referred to as "25 μs LBT") procedure. If the duration of the time gap 260 is equal to 16 μs, then the initiating device 210 may perform a LBT Type 2B (referred to as "16 μs LBT") procedure. If the duration of the time gap 260 is less than 16 μs, then the initiating device 210 may perform a LBT Type 2C procedure which may require no LTB procedure to be performed. That is, if a LBT Type 2C procedure is selected, then the initiating device 210 may directly perform the transmission 252 without actually performing a channel access procedure.

In some example embodiments, the initiating device 210 which has acquired the COT 240 may share the COT 240 with one or more other devices with which it communicates, for example, the responding device 220. To share the COT 240 with the responding device 220, the initiating device 210 may inform (e.g., via control signaling) the responding device 220 about the duration of the COT 240. With the COT sharing mechanism, the responding device 220 may be able to perform a transmission within the COT 240 through a "reduced" LBT procedure. It is noted that the device 220 becomes an initiating device when it performs a transmission.

Figure 2C:
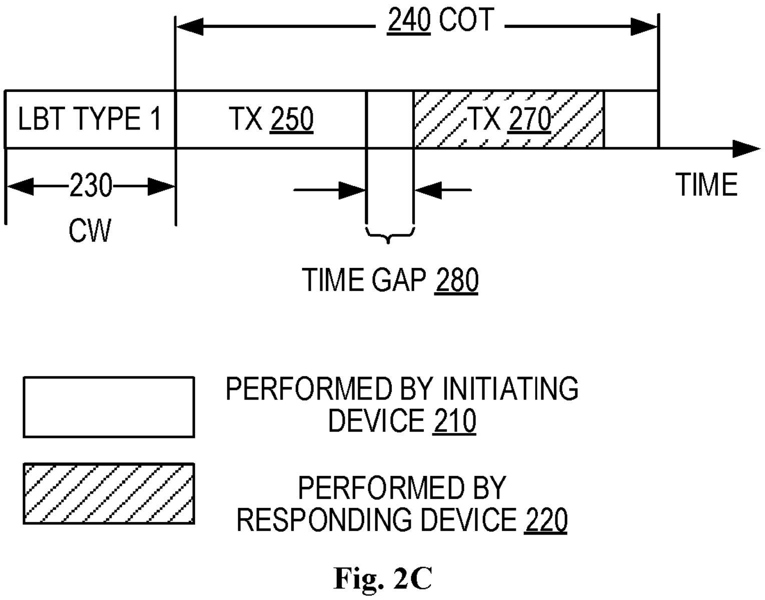

FIG. 2C shows an example of performing a LBT Type 2 procedure before a transmission by the responding device 220 within the COT 240. As shown in FIG. 2C, after completing the LBT Type 1 procedure during the duration of CW 230, the initiating device 210 performs the transmission 250. After that, the responding device 220 may intend to perform a transmission 270 within the COT 240. As shown in FIG. 2C, the responding device 220 may perform a LBT Type 2 procedure before the transmission 270 in order to check that the shared radio frequency band is free for communication.

The LBT Type 2 procedure performed by the responding device 220 may be selected based a duration of a time gap 280 between the transmissions 250 and 270. For example, if the duration of the time gap 280 is greater than or equal to 25 μs, then the responding device 220 may perform a LBT Type 2A procedure. If the duration of the time gap 280 is equal to 16 μs, then the responding device 220 may perform a LBT Type 2B procedure. If the duration of the time gap 280 is less than 16 μs, then the responding device 220 may perform a LBT Type 2C procedure and thus can directly perform the transmission 270. In some cases, if the responding device 220 initiates its transmission outside of the COT 240, then it may need to acquire a new COT using the "extended" LBT procedure.

Through the above discussions, there are multiple types of channel access procedure selectable by the devices based on a time gap between two transmissions to be performed by a same device or two devices in the case of COT sharing.

According a SL slot design, a guard period (also referred to as a guard symbol) is introduced in each time slot (or "slot" for short), during which no transmission is performed. That is, a time gap between two transmissions may be at least equal to or larger than the guard period. With the introductions of guard period, for a small Sub-Carrier Spacing (SCS), the duration of the guard period may be too high to prevent selection of some types of channel access procedures. For example, for SCS of 15, 20, or 60 kHz, the guard period may be higher than 16 μs, which may effectively prevent LBT Type 2B and LBT Type 2C from being applied at these SCSs.

To solve this above mentioned problem, a straightforward way is to simply remove the guard period. However, such approach would to lead to other potential issues. For example, the guard period is introduced to enable transmitting (TX)/receiving (RX) mode switching and to cope with multipath, propagation delay, synchronization uncertainties (e.g. SL devices having different synchronization sources). Therefore, removing the guard period may potentially lead to receiving errors and out of synchronization. Particularly, for some applications where the devices have high mobility towards each other, such as in the vehicle to everything (V2x) applications, removing the guard period will lead to serious synchronization issues.

As discussed above, it is challenging to enhance SL transmissions on a shared radio frequency band. According to some example embodiments of the present disclosure, there is provided a solution for SL transmission enhancement. In this solution, a first device determines a COT to be shared by the first device and at least one second device for transmissions on a shared radio frequency band. The first device selects a first time slot during the COT for a transmission and performs the transmission in the first time slot by extending the transmission to a first guard period of the first time slot or to a second guard period of a second time slot prior to the first time slot during the channel occupancy time. This solution enables the first device to extend a transmission into a guard period of a time slot, so as to reduce the time gap of transmissions caused by the guard period. By reducing the time gap, a channel access procedure requiring a smaller time gap could be selected and performed during the COT. The gap reduction can thus improve the flexibility of channel access procedures for SL transmission in the shared frequency band.

The gap reduction by extending a transmission to a time gap may be performed by a device that obtains the COT or by a device to which the COT is shared in different example embodiments of the present disclosure. In either case, the time gap between two transmissions in the COT may be reduced to meet the requirement of certain types of channel access procedures. The example embodiments of the present disclosure will be described in detail below with reference to the accompanying drawings.

Figure 3:
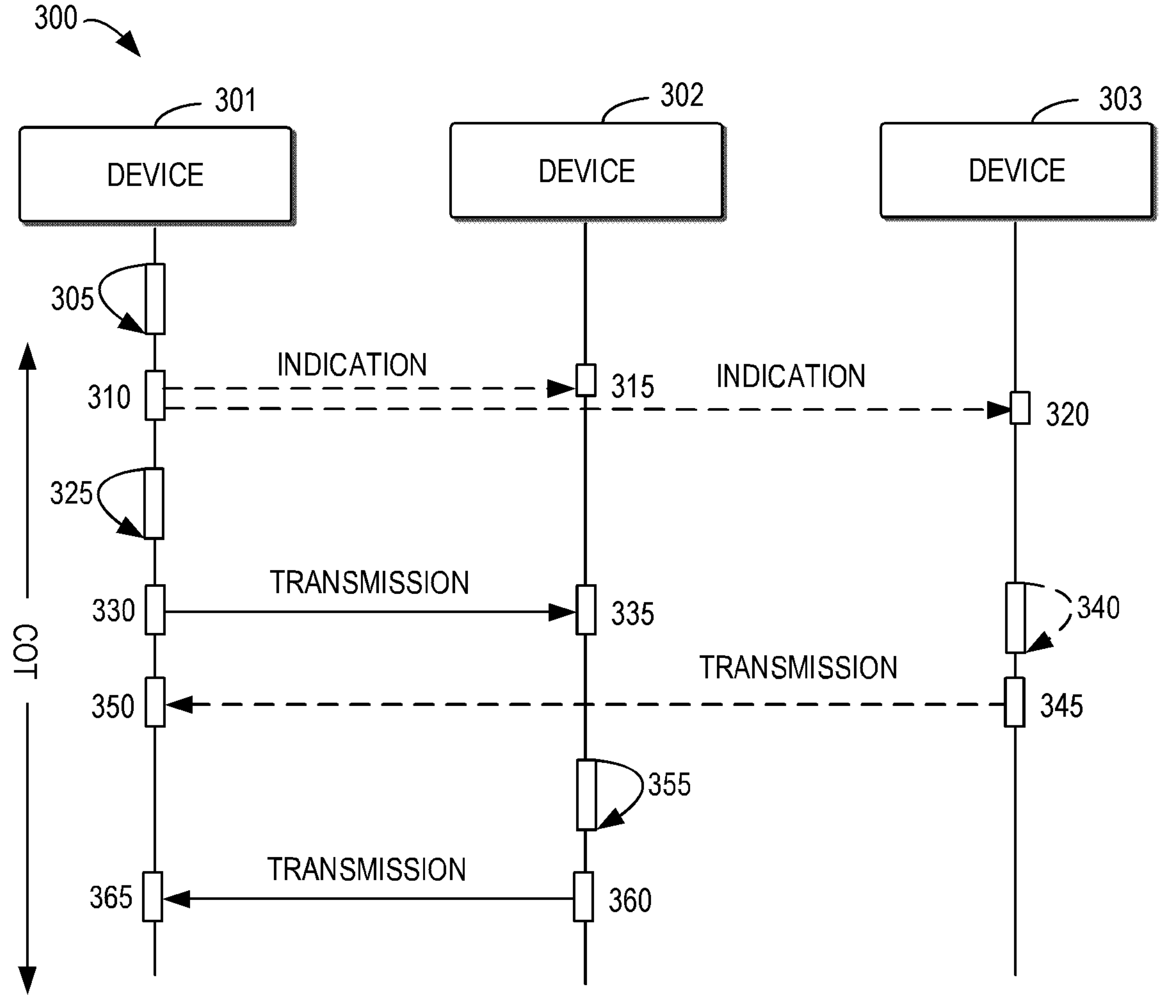
FIG. 3 illustrates a signaling flow for communication according to some example embodiments of the present disclosure.

Reference is now made to FIG. 3, which shows a signaling flow 300 for communication according to some example embodiments of the present disclosure. As shown in FIG. 3, the signaling flow 300 involves a device 301, a device 302, and a device 303 which perform SL communication. In some example embodiments, the devices 301, 302 and 303 may comprise the terminal devices 110 as illustrated in FIG. 1 or any other suitable devices. For the purpose of discussion, there are three devices illustrated in FIG. 3. It is to be understood that the signaling flow 300 may involves more devices or less devices, and the number of devices illustrated in FIG. 3 is only for the purpose of illustration without suggesting any limitations.

In operation, the device 301 determines 305 a COT to be shared with at least one of the devices 302 for transmissions a shared radio frequency band. In some example embodiments, the device 301 may be a device that intends to initiate a transmission to the devices 302 and/or 303 on the shared radio frequency band, and thus may be referred to as an initiating device for this transmission. The devices 302 and 303 may be referred to as responding devices for this transmission.

In the some example embodiments with respect to FIG. 3, as a device obtaining the COT, the device 301 may determine to share the COT with the device 302. In some example embodiments, the device 301 may also determine to share the COT with one or more further devices, such as the device 303. It is to be understood that the two devices 302 and 303 are only for the purpose of illustration without suggesting any limitations, and there would be less than two or more than two devices that may share a shared radio frequency band with device 301.

The device 301 may need to perform a channel access procedure to obtain the COT. In some examples, the channel access procedure to obtain the COT may include a LBT Type 1 procedure. In other example, the device 301 may perform any other channel access procedure applicable for obtaining a COT. For the purpose of illustration, the LBT Type 1 procedure is taken as an example channel access procedure to obtain a COT in the following example embodiments. For example, the device 301 may perform a LBT Type 1 procedure on the duration of CW to determine the COT.

When performing the LBT Type 1 procedure, if the measured power (for example, the collected energy during a Clear Channel Assessment (CCA) slot) is below a regulatory specified threshold, the device 301 may determine the shared frequency band (for example, a channel) as available in the CCA slot. After the device 301 determines the shared frequency band as available for a number of CCA slots, then the device 301 may pass the LBT Type 1 procedure 410 and determines the COT. After determining the COT, the device 301 may indicate the device 302 or device 303 that the device 301 has acquired the COT and the duration of the COT.

In some example embodiments, the duration of CW and COT may be determined according to the Channel Access Priority Class (CAPC) associated with device 301's traffic. For example, Table 1 shows several example durations of CW and COT.

TABLE 1

Example durations of CW and COT

| Channel Access Priority Class (p) | $CW_{min,p}$ | $CW_{max,p}$ | $T_{ulm\ cot,p}$ | allowed $CW_p$ sizes |
|---|---|---|---|---|
| 1 | 3 | 7 | 2 ms | {3, 7} |
| 2 | 7 | 15 | 4 ms | {7, 15} |
| 3 | 15 | 1023 | 6 ms or 10 ms | {15, 31, 63, 127, 255, 511, 1023} |
| 4 | 15 | 1023 | 6 ms or 10 ms | {15, 31, 63, 127, 255, 511, 1023} |

In Table 1, $CW_{min,p}$ and $CW_{max,p}$ respectively denote the minimum and maximum CW length in CCA slots associated with each CAPC; $T_{ulm\ cot,p}$ denotes the duration of the COT; p denotes channel access priority class. Control plane traffic such as PSCCH is transmitted with p=1, while user plane traffic has p>1. For example, when the duration of COT is equal to 6 ms, it may be increased to 8 ms by inserting one or more guard periods.

In some cases, the device 301 may share the obtained COT with one or more other devices with which it communicates. In the example embodiments of FIG. 3, the device 301 shares the COT with the device 302, and in some cases with the device 303. Therefore, the devices 301 and/or 302 may initiate transmissions during the COT, without performing an extended channel access procedure (e.g., the LBT Type 1 procedure). In some example embodiments, to share the COT with the devices 302 and/or 303, the device 301 may transmit COT sharing information to the devices 302 and/or 303, to inform (e.g., via control signaling) them about the duration of the COT and other information about the COT.

As discussed above with reference to FIGS. 2A-2B, a reduced channel access procedure may still be needed within the COT and a type of the channel access procedure to be performed within the COT is based on a time gap between transmissions. Typically, a slot structure includes a plurality of symbols each occupying a period of time, where one or more guard symbols may be included. A period of a guard symbol is referred to as a guard period. A conventional transmission is not performed during the guard period. In accordance with example embodiments of the present disclosure, to enable some types of channel access procedures to be selectable, it is proposed to extend a transmission into a guard period of a time slot to reduce a time gap between transmissions.

In the illustrated example embodiments of FIG. 3, the devices 301 and/or 303 may be configured to perform an extension of a transmission(s), so as to ensure that the device 302 can select a certain type of channel access procedure for transmissions within the COT. Alternatively, or in addition, as will be discussed later with reference to FIG. 5, the device 302 may be configured to perform the gap reduction, so as to enable the device 302 to select the certain type of channel access procedure.

In some example embodiments of FIG. 3, the device 301 may transmit 310 an indication to the device 302, to indicate that an extension of a transmission to a guard period of a time slot during the COT is enabled by the device 301 or by the device 303. In some example embodiments, an extension of a transmission to a guard gap may include extending the duration of the transmission to a guard period of a same time slot where this transmission is performed or to start the transmission earlier in a guard period of a preceding time slot. In the example embodiments illustrated in FIG. 3, if the extension of the transmission is enabled by the device 301 or by the device 303, the duration of the transmission may be extended to the guard period of the same time slot.

In some example embodiments, the device 301 may transmit an indication in the form of a single bit, to indicate that the gap reduction by the extension of the transmission is enabled. In some example embodiments, the device 301 may transmit an indication in the form of a bitmap of the slots/symbols within the COT, to specifically indicate that the gap reduction is enabled in one or more specific slots or symbols during the COT. In some example embodiments, the indication may be transmitted via physical layer (PHY) signaling, such as second stage sidelink control information (SCI).

Upon receiving 315 the indication from the device 301, the device 302 may determine, based on the received indication, whether an extension of a transmission is enabled during the COT or during one or more slots of the COT. In some examples, the device 302 may determine from the indication whether the extension of the transmission is enabled by the device 301 and/or the device 303. In some example embodiments, the device 302 may be configured by default that the extension of the transmission is enabled by the device 301 and/or the device 303 during the COT or during one or more slots of the COT.

Alternatively or in addition, in some cases where the device 301 shares the COT with one or more further devices, such as the device 303, the device 303 may also be configured to provide the gap reduction for the device 302 through an extension of a transmission. In some example embodiments, the device 301 may transmit 310 an indication to the device 303, to indicate that an extension of a transmission to a guard period of a time slot during the COT or in one or more slots of the COT is enabled by the device 303. By receiving 320 the indication, the device 303 may determine whether or where an extension of a transmission is to be performed during the shared COT. In some example embodiments, the device 303 may be configured by default to perform the extension of the transmission during the COT shared by the device 301.

During the COT, the device 301 intends to perform one or more transmissions to the devices 302 and/or 303. Specifically, the device 301 selects 325, a time slot during the COT for a transmission. For example, the device 301 may select the first time slot of the COT for an initial transmission. In some example embodiments, the device 302 may select one or more following times slots during the COT. In some example embodiments, to enable the gap reduction for the device 302, the device 301 may select a time slot immediately prior to a time slot in which the device 302 will perform a transmission.

With the time slot selected, the device 301 performs 330 the transmission in the selected time slot. In some example embodiments where the device 301 is configured to perform an extension of a transmission, the device 301 may extend the transmission to a guard period of the selected time slot. Such a transmission may be referred to as an extended transmission. In some example embodiments, the end point of the transmission may be extended towards a point within the guard period. After such extension, a time gap between the end point of the transmission and a start point of a following transmission to be performed by the device 302 can be reduced to be less than the guard period. In some example embodiments, the transmission may be extended to any suitable guard period of the time slot, depending on the transmission to be performed and/or the slot structure. In some examples, the guard period may include a last symbol of a time slot. In some examples, the guard period may not be the last symbol but a middle symbol of the time slot.

Figure 4A:
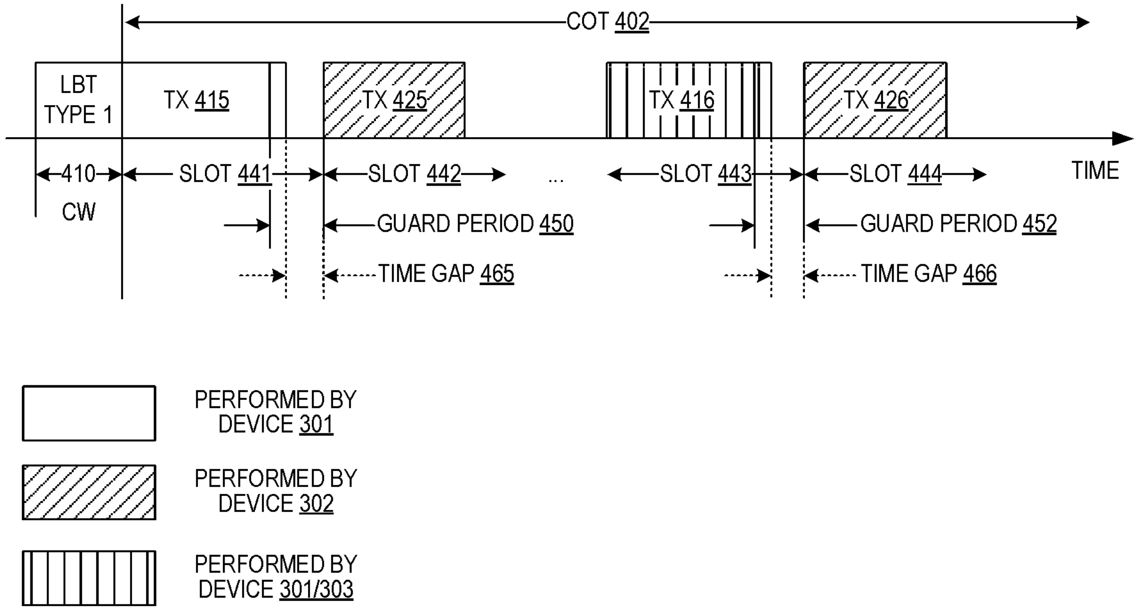
FIGS. 4A-4B illustrate some example of extension of transmissions according to some example embodiments of the present disclosure.

FIG. 4A illustrates some examples of an extension of a transmission for the purpose of gap reduction for the device 302. As shown in FIG. 4A, the device 301 performs a LBT Type 1 procedure during a CW 410 and obtains a COT 402 which can be shared with the devices 302 and 303. After that, the device 301 performs a transmission 415 in a slot 441. To assist the device 302 in selecting a channel access procedure with a requirement of a limited time gap, the device 301 extends the transmission 415 to a guard period 450 of the slot 441.

In some example embodiments, the end point of the transmission in the guard period may be determined such that the time gap between the transmission and the following transmission is within a time gap limit for a certain type of channel access procedure. By extending the transmission of the device 301 to reduce the time gap between two consecutive transmissions, the type of channel access procedure requiring a limited time gap may be selected by the device 302. In some example embodiments, the time gap may be reduced to meet a time gap limit for a target type of channel access procedure, such as a Type 2B channel access procedure (also referred to as LBT Type 2B procedure) and/or a Type 2C channel access procedure (also referred to as LBT Type 2C procedure). For example, the time gap may be reduced to be equal to 16 μs, such that a LBT Type 2B procedure may be performed by the device 302. As another example, the time gap may be reduced to be less than 16 μs, such that a LBT Type 2C procedure may be performed by the device 302.

In some example embodiments, with the extension of the transmission performed by the device 301, the device 302 determines 355 a channel access procedure to be performed before its transmission. The channel access procedure is selected based on the time gap from the end of the preceding transmission by the device 301 to the start of the transmission by the device 302. In some examples, depending on the size of the time gap, the device 302 may perform a LBT Type 2B procedure or a LBT Type 2C procedure. Thus, due the extension of the preceding transmission performed by the device 301, the device 302 may be able to select and perform the channel access procedure that requires a shorter period of time for channel monitoring.

Depending on the result of the channel access procedure, the device 302 performs 360 its transmission in the time slot following a time slot in which the preceding transmission is extended during the COT, and the device 301 receives 365 this transmission. In some examples, if the LBT Type 2C procedure is selected based on the time gap, the device 302 may directly perform the transmission without monitoring for the idle channel. In some examples, if the LBT Type 2B procedure is selected, the device 302 may perform the transmission when the LBT Type 2B procedure is successfully completed.

As shown in FIG. 4A, the end point of the transmission 415 is extended into the guard period 450 to reduce a time gap 465 between the end of the transmission 415 and a start of a following transmission 425 to be performed by the device 302. The device 302 may perform a LBT Type 2C procedure or a LBT Type 2B procedure depending on the size of the reduced time gap 465, and then perform the transmission 425 in the slot 442.

In some example embodiments, if the device 302 intends to perform a transmission after several time slots from the initial transmission in the COT, the device 301 may also support the gap reduction for the device 302, as mentioned above. In the illustrated example of FIG. 4A, the device 302 intends to perform a transmission 426 in a slot 444 during the COT 402. The device 301 may determine or be notified of the time slot(s) in which the device 302 will perform a transmission. To enable gap reduction for the device 302, the device 301 may perform a transmission 416 in a slot 443 prior to the slot 444 by extending the transmission 416 into a guard period 452 of the slot 443.

Due to the extension of the transmission 416, a time gap 466 between the end of the transmission 416 and a start of the transmission 426 is reduced, for example, to be within a time gap limit for a certain type of channel access procedure that is desired. Thus, the device 302 may perform the type of channel access procedure before the transmission 426. In some examples, if the time gap limit for the LBT Type 2C procedure is satisfied (e.g., the time gap is less than 16 μs), the device 302 may perform the transmission 426 without detecting whether the shared radio frequency band is idle or not.

In some example embodiments, as an alternative or in addition to the device 301, the device 303 may also be configured to perform an extension of a transmission during the COT shared by the device 301, in order to provide the gap reduction for the device 302. As illustrated, in the signaling flow 300, the device 303 may select 340 a time slot during the COT shared by the device 301 for a transmission. In some example embodiments, the device 302 may be able to select a time slot after the device 301 performed the initial transmission. The device 303 may perform 345 the transmission in the selected time slot by extending the transmission to a guard period of the selected time slot. In some example embodiments, the device 303 may perform a channel access procedure before the selected time slot and perform the transmission after the channel access procedure is successfully completed.

In the illustrated example of FIG. 4A, the device 303, instead of the device 301, may perform the transmission 416 in the slot 443 prior to the transmission 426 to be performed by the device 302 in the slot 444. The extension of the transmission 416 performed by the device 303 may also reduce the time gap 466 to meet the time gap limit required by a certain type of channel access procedure that is desired, such as the LBT Type 2B or the LBT Type 2C procedure.

In some example embodiments, to support the gap reduction for the device 302, the device 301 or the device 303 may select the time slot for transmission extension based on whether that a transmission is to be performed by the device 302 in a time slot having a gap of at least one time slot from a preceding transmission performed during the COT. If a transmission to be performed by the device 302 has a gap of at least one time slot from a preceding transmission performed during the COT, the device 301 or the device 303 may select a time slot immediately prior to the time slot selected by the device 302 and starts a transmission. After the device 301 or 303 selects the time slot, it may perform a channel access procedure on the shared radio frequency band, in order to initiate a transmission in the COT. The channel access procedure to be performed may be determined based a time gap from the end of the preceding transmission and a start of the transmission to be initiated by the device 301 or 303. In some example embodiments, the time gap may be relatively large. In some examples, the time gap may cause the device 301 or 303 to select the LBT Type 2A procedure.

If the channel access procedure (such as a LBT Type 2 procedure) is successfully completed, the device 301 or 303 may perform a transmission for a partial duration of the guard period of the selected time slot. In some example embodiments, the transmission may start at a start point of a guard period of the selected time slot and last for a part of the guard period. Such as transmission is also referred to as a sub-symbol transmission. By performing the transmission for a partial duration of the guard period of the time slot, it can ensure that the LBT Type 2B or LBT Type 2C procedure can be performed by the device 302.

Figure 4B:
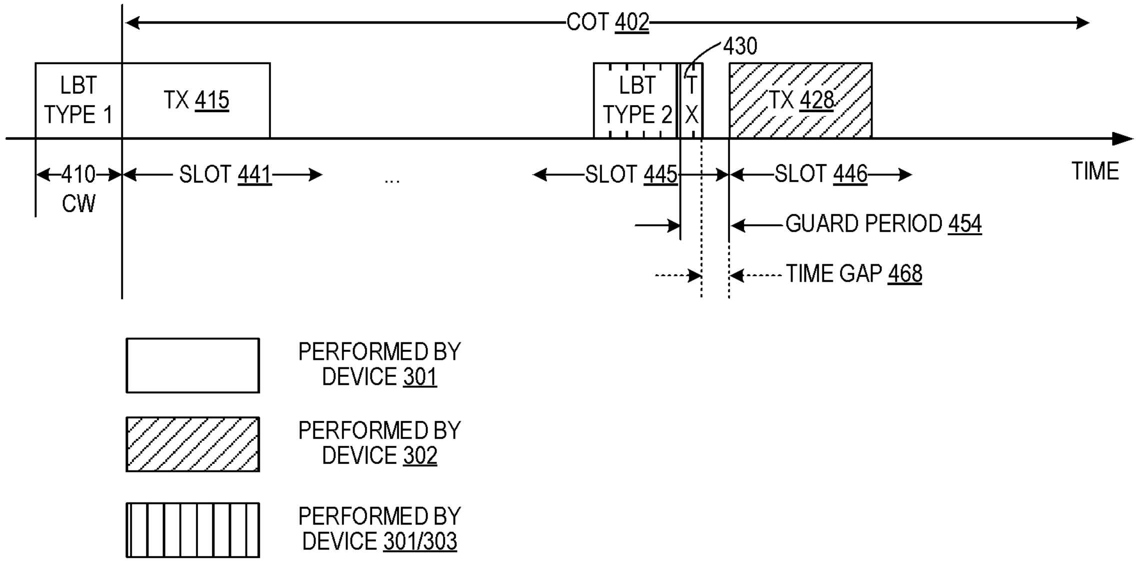

FIG. 4B illustrates an example of extension of transmission in the above situation. As illustrated in FIG. 4B, after the transmission 415 performed by the device 301 in the COT 402, the device 301 or 302 may determine that a further transmission 428 is to be performed by device 302 in a slot 446. The slot 446 has a gap of at least one time slot from the preceding transmission 415 during the COT. The device 301 or 303 may thus select a slot 445 immediately prior to the slot 446 to be the first time slot. To perform a transmission on the slot 445, the device 301 or 303 may perform a channel access procedure based on a time gap between the start of the transmission and the preceding transmission. Generally, such a time gap may cause the device 301 or 303 to select a LBT Type 2A procedure.

If the channel access procedure is successfully completed, the device 301 or 303 may perform a transmission (for example, a sub-symbol transmission) 430 for a partial duration of the guard period 454 of the time slot 445. By performing the transmission 430 in the guard period 454, a time gap 468 between the transmission 428 to be performed by the device 302 and its preceding transmission (i.e., the transmission 430) will be reduced to be within a time gap limit for a type of channel access procedure (e.g., the LBT Type 2C procedure or the LBT Type 2B procedure). For example, the time gap 468 may be reduced to be less than or equal to 16 μs. As such, if the time gap 468 is equal to 16 μs, a LBT Type 2B procedure could be applied by the device 302. If the time gap 468 is less than 16 μs, a LBT Type 2C procedure could be applied by the device 302. The device 302 may apply the selected channel access procedure during the time gap 468 and then perform the transmission 428 in the slot 446. The device 302 may perform the channel access procedure based on the size of the reduced time gap 468.

In some example embodiments, the transmission 430 may be a gap reduction beacon or a PSFCH transmission from the device 301 or 303. This gap reduction beacon may indicate this sub-symbol transmission is for the purpose of reducing the guard period. In some examples, the device 301 or 303 may transmit a feedback indication as in the PSFCH transmission during the guard period. As the feedback indication may include one bit or several bits, the sub-symbol transmission lasting for a short time may be enough.

In some example embodiments, if the channel access procedure to be performed by the device 301 or 303 is not successfully completed, the transmission 430 may not be performed and thus the time gap from the preceding transmission 415 to the transmission 428 may not be reduced. In such a case, with the successful gap reduction supported by the device 301 or 303, the device 302 may revert to select and perform another type of channel access procedure (such as the LBT Type 2A procedure). The device 302 may perform its transmission based on the result of the performed channel access procedure.

Several example embodiments according to the present disclosure have been described above with respect to FIG. 3 and FIGS. 4A-4B. Through these embodiments according to the present disclosure, the time gap between two transmissions may be reduced by performing the extension of transmission. By reducing the time gap, channel access procedure having a short time gap limit can be selectable by the device during the COT. In addition, the guard period is not completely skipped but is partially used for transmission, which can still guarantee the TX/RX mode switching and handle the synchronization issues between different devices.

More example embodiments according to the present disclosure will be described below with respect to FIGS. 5-6. In these example embodiments, the device 302 may be configured to perform the gap reduction.

Figure 5:
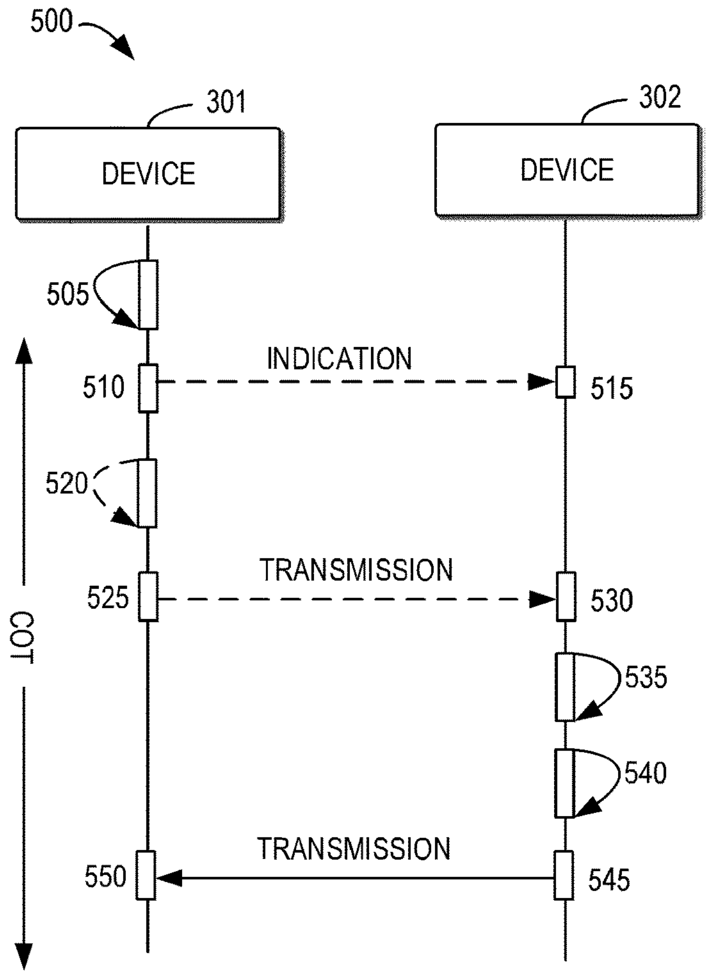
FIG. 5 illustrates another signaling flow for communication according to some example embodiments of the present disclosure.

FIG. 5 shows a signaling flow 500 for communication according to some example embodiments of the present disclosure. As shown in FIG. 5, the signaling flow 500 involves the device 301 and the device 302 for SL communication. In some example embodiments, the devices 301 and 302 may comprise the terminal devices 110 as illustrated in FIG. 1 or any other suitable devices. For the purpose of discussion, there are two devices illustrated in FIG. 5. It is to be understood that the signaling flow 500 may involves more devices or less devices, and the number of devices illustrated in FIG. 5 is only for the purpose of illustration without suggesting any limitations.

In the example embodiments in FIG. 5, the device 302 may be configured to perform the gap reduction in a COT shared by the device 301. In operation, the device 301 may perform 505 a channel access procedure to obtain the COT and share the COT with at least the device 302 for transmissions. The channel access procedure performed to obtain the COT may be similar as the one discussed above.

In some example embodiments, the device 301 may transmit 510 an indication to the device 302, to indicate that an extension of a transmission to a guard period of a time slot during the COT is enabled by the device 302. In some example embodiments, the device 301 may transmit an indication in the form of a single bit, to indicate that the gap reduction by the extension of the transmission is enabled. In some example embodiments, the device 301 may transmit an indication in the form of a bitmap of the slots/symbols within the COT, to specifically indicate that the gap reduction is enabled in one or more specific slots or symbols during the COT. In some example embodiments, the indication may be transmitted via PHY signaling, such as second SCI.

Upon receiving 515 the indication from the device 301, the device 302 may determine, based on the received indication, whether an extension of a transmission is enabled during the COT or during one or more slots of the COT. In some example embodiments, the device 302 may be configured by default that the extension of the transmission is enabled by the device 301 and/or the device 303 during the COT or during one or more slots of the COT.

In some example embodiments, after obtaining the COT, the device 301 may select 520 a time slot during the COT and perform 525 a transmission to the device 302 or the device 303 (not illustrated in FIG. 5). For example, the device 301 may select the first time slot of the COT for an initial transmission. In some other examples, the device 302 may select one or more following times slots during the COT. The device 302 may receive 530 such an initial transmission or a following transmission from the device 302.

At the side of the device 302, the device 302 determines 535 the COT to be shared by the device 301 for transmissions. For example, the device 302 may receive COT sharing information from the device 301, indicating that a duration of the COT shared by the device 301. The device 302 thus can perform one or more transmissions during the shared COT.

In the signaling flow 500, the device 302 selects 540 a time slot during the COT for a transmission and performs 545 the transmission in the selected time slot by extending the transmission to a guard period of a time slot prior to the selected time slot. That is, the device 302 starts its transmission earlier than the start of the time slot selected for communication. The transmission performed by the device 302 may also be referred to as an earlier transmission. In some examples, the start point of the transmission may be extended to a point within the guard period of the preceding time slot, such that the time gap between the point and an end point of a preceding transmission in the preceding time slot is within the time gap limit for a type of channel access procedure. By doing so, the time gap between transmissions may be reduced and the device 302 may select and perform the type of channel access procedure. In some example embodiments, the device 302 may select the time slot in the COT for its earlier transmission as a time slot immediately following a time slot in which a preceding transmission is performed. The preceding transmission may be performed by the device 301, by the device 303, or even by the device 302.

Figure 6:
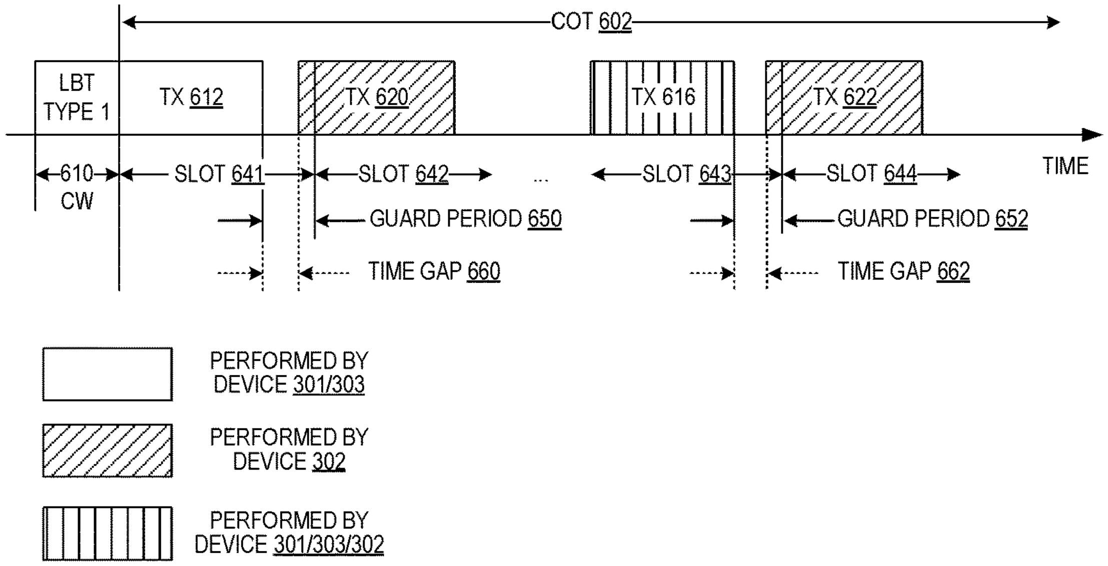
FIG. 6 illustrates an example of extension of transmissions according to some example embodiments of the present disclosure.

FIG. 6 illustrates some examples of an extension of a transmission performed by the device 302 for the purpose of gap reduction. As shown in FIG. 6, the device 301 performs a LBT Type 1 procedure during a CW 610 and determines a COT 602 to be shared with at least the device 302 on a shared radio frequency band. For example, as illustrated in FIG. 6, the device 301 may perform an initial transmission 612 in the first time slot 641 of the COT 602. Further, the device 302 may select a slot 642 immediately after the slot 642 for a transmission 620.

To reduce the time gap with the preceding transmission 612 in the preceding time slot 641, the device 302 extends a start point of the transmission 620 to a point within a guard period 650 of the slot 641 such that a time gap 660 between an end point of the preceding transmission 612 and the start point of the transmission 620 is within a time gap limit for a type of channel access procedure, such as a time gap limit of 16 μs or a time gap limit of less than 16 μs. Based on the reduced time gap, the device 302 may perform a LBT Type 2B procedure (if the time gap 660 is equal to 16 μs) or a LBT Type 2C procedure (if the time gap 660 is less than 16 μs) and then perform the transmission 620 based on the result of the channel access procedure. It is noted that the transmission 620 may also be performed if the LBT Type 2C procedure is performed.

As further illustrated in FIG. 6, in some cases, a transmission 616 is performed in a slot 643 by the device 301, the device 303, or the device 302 itself. The slot 643 may be any time slot other than the first time slot in the COT 602. The device 302 may intend to perform a further transmission 622 in a slot 644 immediately following the slot 643. To reduce the time gap, the device 302 extends a start point of the transmission 622 to a point within a guard period 652 of the slot 644. The time gap 662 between the transmissions 616 and the transmission 622 may be reduced in a similar way as the time gap 660 such that the device 302 may be able to select the type of channel access procedure for performing the transmission 622.

Some example embodiments of extending a transmission to a guard period to reduce a time gap between transmissions have been discussed above with reference to FIGS. 3-6. In some example embodiments, the device 301, which obtains the COT, may determine whether an extension of a transmission to a guard period(s) of one or more time slots during the COT is allowed based on one or more conditions. In some example embodiments, the device 301 may determine the extension of the transmission is allowed based on a resource configuration (sometimes referred to as a "resource pool configuration") for the COT. In the resource allocation mode 1 for SL communication, the device 301 may receive the resource configuration may be received from a network device. Alternatively, in the resource allocation mode 2 for SL communication, the resource configuration may be comprised in SCI. The resource configuration may indicate whether the extension of the transmission is allowed for one or more time slots of a COT, or whether the extension of the transmission is enabled by the device 301 or other device.

Alternatively, or in addition, the device 301 may determine whether the extension of the transmission is allowed based on whether the device 301 and/or the device 303 are under a same synchronization source with the device 302. In some examples, the device 301 may determine if the device 301 and/or the device 303 are connected to a same Global Navigation Satellite System (GNSS) with the device 302, or within the same coverage area of a network device (e.g., a gNB) with the device 302. In some examples, the device 301 may determine that the associated synchronization signal is above a certain threshold (e.g. a reference signals receives power (RSRP) threshold), and then determine that other nearby devices (such as the device 302 and device 303) need to also be under the same synchronization source. In some examples, the synchronization source information may be comprised in the resource configuration configured by another device or comprised in SCI.

As mentioned above, a guard period is introduced in the slot structure to with multipath, propagation delay, synchronization uncertainties. Generally, for use cases without high mobility (such as non-V2x cases), the propagation delay may not be the problem (see values per SCS in Table), but the presence of different synchronization sources possibly cause their slot structures not be aligned in time. Hence, in the use cases of different synchronization sources, it is better to maintain the reasonable guard period in each slot.

period in the case of the same synchronization source, it can make sure that the reduced time gap between two transmissions of two devices may not cause out of synchronization issue between the devices.

In some example embodiments, as an alternative or in addition, a further condition related to the allowance of the extension of the transmission is based on a congestion level in the shared radio frequency band. The device 302 may determine whether the congestion level is above a congestion threshold. The congestion threshold may be comprised in the resource configuration configured by another device or comprised in SCI. If the congestion level in the shared radio frequency band is above the congestion threshold, then the device 301 may determine that the extension of the transmission is allowed. The motivation for this condition is that applying the LBT Type 2C/B procedure in high congestion conditions may achieve more benefits since it is more likely that the LBT Type 2A procedure will be successful when the congestion level is low. By doing so, the success of SL transmissions in high congestion conditions can be increased.

Alternatively, or in addition, the device 301 may further determine a priority of a transmission to be performed by the device 302. The priority of the transmission may be associated with a priority of the device 302, a priority of the user of the device 302, a service/or application initiating the transmission, or the like. In some examples, if the priority of the transmission is determined to be higher than a priority threshold, the device 301 may determine that the extension of the transmission for the device 302 is allowed. By doing so, it is possible to increase the success of SL transmissions with higher priority.

In some example embodiments, after determining that an extension of a transmission to a guard period of a time slot during the COT is allowed, the device 301 may transmit the indication to the device 302 and/or the device 303 as discussed with reference to FIG. 3 and FIG. 5.

In some example embodiments, the transmission performed by the device 301, 302, or 303 may comprise a transmission for a PSFCH, PSCCH, and/or for a PSCCH. In some examples, one of the devices 301-303 may perform a transmission for PSCCH or PSSCH to one or more other devices of the devices 301-303. After that, the other device(s) may perform a following transmission for PSCCH or PSSCH or otherwise PSFCH. An example of the transmission for a PSFCH will be illustrated in details with respect to FIG. 7F later.

Some specific examples of the extension of the transmission will be described in details with respect to FIGS. 7A-7F

TABLE 2

Analysis of the maximum propagation delay (in m) for the different SCS

| Parameter | Numerology (u) 0 | 1 | 2 | 3 | 4 |
|---|---|---|---|---|---|
| Subcarrier Spacing (Khz) | 15 | 30 | 60 | 120 | 240 |
| OFDM Symbol Duration (us) | 66.67 | 33.33 | 16.67 | 8.33 | 4.17 |
| Cyclic Prefix (CP) Duration (us) | 4.69 | 2.34 | 1.17 | 0.57 | 0.29 |
| OFDM Symbol including CP (us) | 71.35 | 35.68 | 17.84 | 8.92 | 4.46 |
| Applied gap reduction (us) | >55.35 | >19.68 | >1.84 | — | — |
| Remaining Guard + CP of symbol 0 (us) | 16 +4.69 | 16 +2.34 | 16 + 1.17 | 8.92 + 0.57 | 4.46 + 0.29 |
| Maximum propagation delay (m) | 6202.7 | 5498.2 | 5147.4 | 2845.0 | 1424.0 |

On the other hand, in the example embodiments, by allowing the extension of the transmission into the guard as follows. In those examples shown in FIGS. 7A-7E and in FIG. 7F, two different example structures are illustrated, with fourteen symbols indexed from Symbol 0 to Symbol 13. The information carried in the corresponding symbols of each slot are also illustrated, including information for automatic gain control (AGC), PSSCH, PSCCH, and Demodulation Reference Signal (DMRS). In FIGS. 7A-7E, Symbol 13 is a guard period in a time slot. In FIG. 7F, Symbol 10 and Symbol 13 are guard periods in a time slot. It would be appreciated that the slot structures and the specific information carried in the symbols are provided for the purpose of illustration only, and other slot structures and information may also be applicable to the example embodiments of the present disclosure.

Figure 7A:
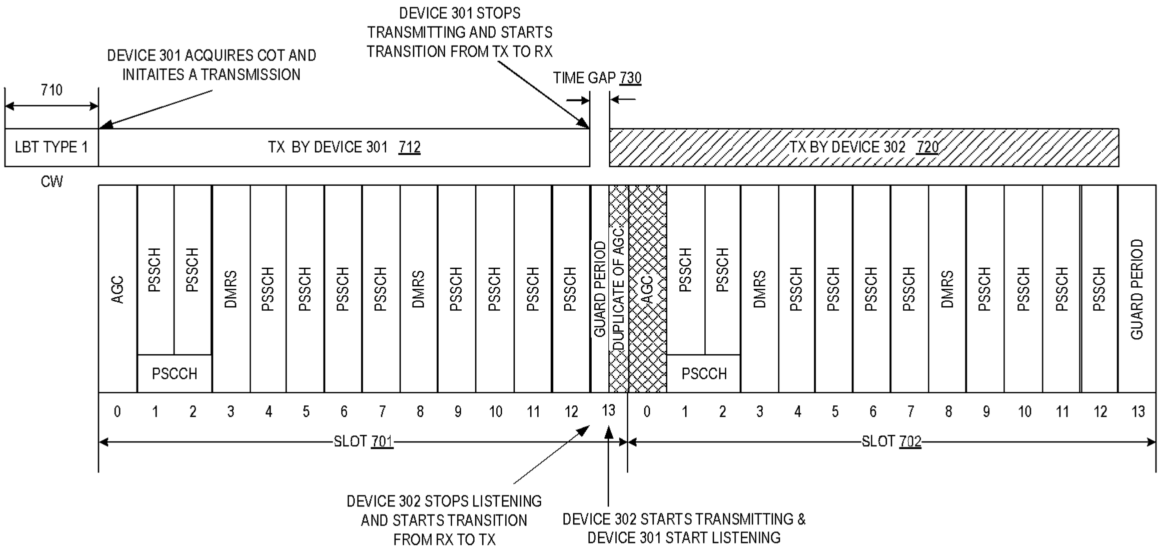
FIGS. 7A-7F illustrate some example of extension of transmissions in slot structures according to some example embodiments of the present disclosure.

FIG. 7A shows an example of an earlier transmission according to some example embodiments of the present disclosure. In this example, the device 302 performs an earlier transmission by extending its transmission to a guard period of a preceding time slot. As shown in FIG. 7A, the device 301 may perform a LBT Type 1 procedure for a duration of CW 710. Due to the success of the LBT Type 1 procedure, the device 301 may acquire a COT and initiate a transmission 712 at the end point of the LBT Type 1 procedure 710 and at the start point of a slot 701 during the acquired COT. In this example, the transmission 710 lasts from Symbol 0 to Symbol 12 within the slot 701. Further, the device 301 may determine to share the COT with at least the device 302.

In some examples, the PSCCH transmitted in the slot 701 may include an indication of COT sharing information the COT and an indication that an extension of a transmission is enabled by the device 302 in one or more slots within the COT. The device 302 may intend to perform a transmission 720 in a slot 702 following the slot 702. As the device 302 is enabled to perform an extension of a transmission, it may determine to extend a start point of the transmission 720 to a point within the guard period of the preceding slot 701. That is, the transmission 720 in the slot 702 can be started earlier. As the start point is within the guard period, the device 302 may determine a time gap 730 between the end point of the transmission 712 and the start point of the transmission 720 meets a time gap limit of a channel access procedure, such as the LBT Type 2B procedure or the LBT Type 2C procedure.

If the LBT Type 2B procedure is selected, the device 302 may perform the corresponding channel access procedure and starts the transmission 720 at the corresponding start point in the guard period of the slot 701 if the LBT Type 2B procedure is successfully completed. If the LBT Type 2C procedure is selected, the device 302 may directly start the transmission 720 without detecting whether the shared frequency band is idle or not.

At illustrated in FIG. 7A, before the start point of the transmission 720, the device 302 may stop listening and start transition from a TX mode to a RX mode in the reduced time gap 730. The device 302 may start transmitting and the device 302 may start listening on the shared frequency band from the device 302 at the start point of the transmission located within the guard period of the slot 701.

As the transmission 730 is started earlier before the slot 720, the device 302 may transmit a duplicate of information to be transmitted at the beginning of the slot 702. As illustrated, the device 302 may transmit a duplicate of information about AGC (which is to be carried in Symbol 0 of the slot 702). Depending on the duration from the start point in the guard period to the beginning of the slot 702, all or partial information about AGC in Symbol 0 may be transmitted in the guard period of the slot 701.

It is noted that the transmission 730 does not occupy all the guard period of the slot 701 such that there is still a reduced time gap 730 between the transmissions 712 and 720. In some examples, the time gap 730 may be reduced to equal to or less than 16 μs. Thus, a LBT Type 2B or a LBT Type 2C procedure can be performed during the time gap 730.

Figure 7B:
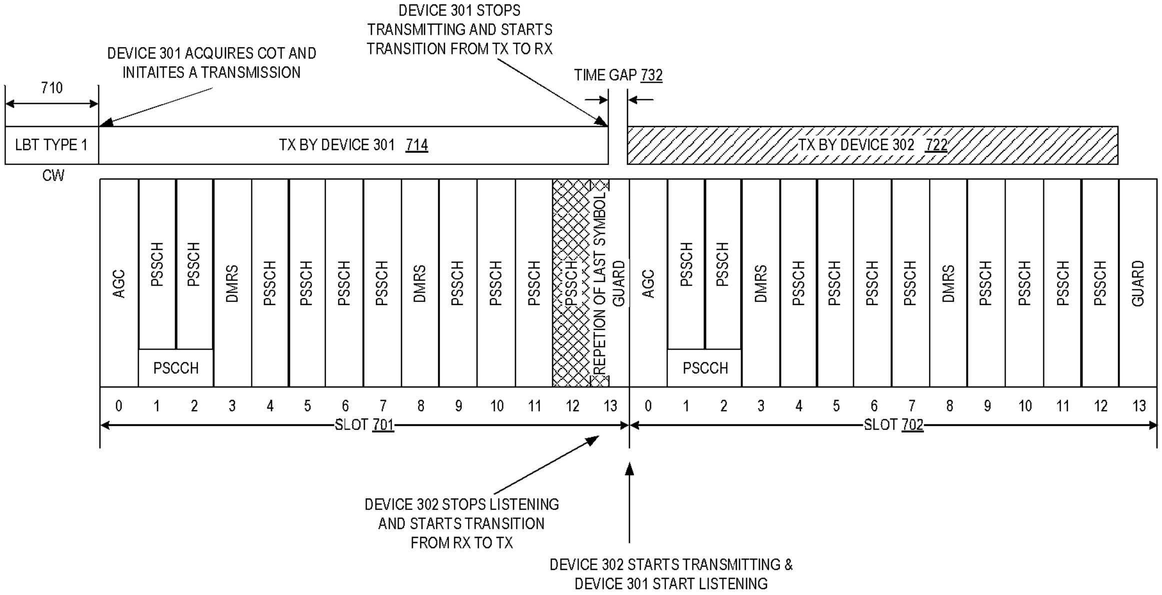

FIG. 7B shows an example of an extended transmission according to some example embodiments of the present disclosure. In this example, the device 301 performs an extended transmission by extending its transmission to a guard period of a current time slot. Similarly to the example of FIG. 7A, the device 301 may perform a LBT Type 1 procedure in a duration of CW 710 to obtain a COT. The device 301 may initiate a transmission 714 in the slot 701 of the COT. The device 301 may determine to share the COT with at least the device 302.

In some examples, the PSCCH transmitted in the slot 701 may include an indication of COT sharing information the COT and an indication that an extension of a transmission is enabled by the device 301 in one or more slots within the COT. When the device 302 intends to perform a transmission 722 in the slot 702 following the slot 701, the device 301 may extend the transmission 714 to the guard period of the slot 701 such that a time gap 732 between the transmissions 714 by the device 301 and the transmission 722 to be performed by the device 302 is reduced to be less than the guard period.

In the example of FIG. 7B, the device 301 may stop transmitting and start transition from a TX mode to a RX mode at the end of the transmission 714. The device 302 may stop listening and start transition from a RX mode to a TX mode at the end of the transmission 714. After the end of the slot 701, the device 302 starts transmitting and the device 301 starts listening at the start point of the following slot 702. In this example, due to the reduced time gap 732, the device 303 may perform a LBT Type 2B procedure or a LBT Type 2C procedure before the transmission 722, depending on the size of the reduced time gap 732.

Figure 7C:
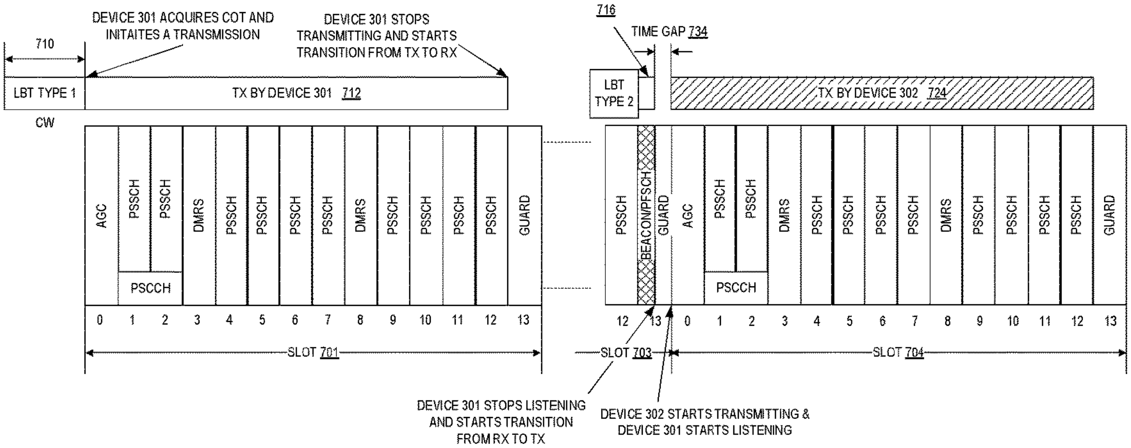

FIG. 7C shows another example of extension of transmission in the case that a further transmission is to be performed after at least one time slot from a preceding transmission performed during the COT. In this example, the extension of transmission is enabled by the device 301. Similarly to the example of FIG. 7A, the device 301 first acquires a COT and initiates the transmission 712 in the slot 701 in the example of FIG. 7C. PSCCH of the slot 701 indicate the COT sharing information and if an extension of a transmission is enabled in one or more slots within the COT. Then the device 301 stops transmitting and starts transition from a TX mode to a RX mode at the transmission 712.

After at least one slot following the slot 701, the device 301 may determine that a further transmission 720 is to be performed by another device (for example, the device 302) at slot 704. In this case, since the slot 704 has a gap of at least one slot from the preceding transmission 712 in the COT, the device 301 may select a slot 703 immediately prior to the slot 704 to perform a LBT Type 2 procedure (for example, a LBT Type 2A procedure). If the LBT Type 2 procedure is successfully completed, the device 301 may perform a transmission 716 for at least a partial duration of a guard period of the slot 703. In the illustrated example, the LBT Type 2 procedure is performed and completed before the guard period of the slot 703, and the transmission starts at the start point of the guard period of the slot 703. Such as transmission is also referred to as a sub-symbol transmission. In some other examples, depending on where the LBT Type 2 procedure is completed in the slot 703, the transmission 716 may be started before the guard period of the slot 703 and thus may be last longer. The transmission 716 may end before the following slot 704, so as to leave a time gap 734 between the transmission 716 and the following transmission 724.

In some examples, the device 301 may transmit a gap reduction beacon in the transmission 716, to indicate that this transmission is for the purpose of reducing the guard period. In some examples, the device 301 may transmit a feedback indication (e.g., PFSCH) in the transmission 716. As the feedback indication may include one bit or several bits, the transmission 716 lasting for a short time may be enough.

In the example of FIG. 7C, the device 301 may stop listening and start transition from a RX mode to a TX mode at the start point of time gap 734. The device 302 may start transmitting and the device 301 may start listening at the start point of the slot 704. As the transmission 716 is performed in the guard period of the slot 703, the time gap 734 is reduced, for example, to be less than or equal to 16 μs. As such, the device 302 may perform a LBT Type 2B or 2C procedure in the time gap 734 before performing the transmission 724 in the slot 704.

Figure 7D:
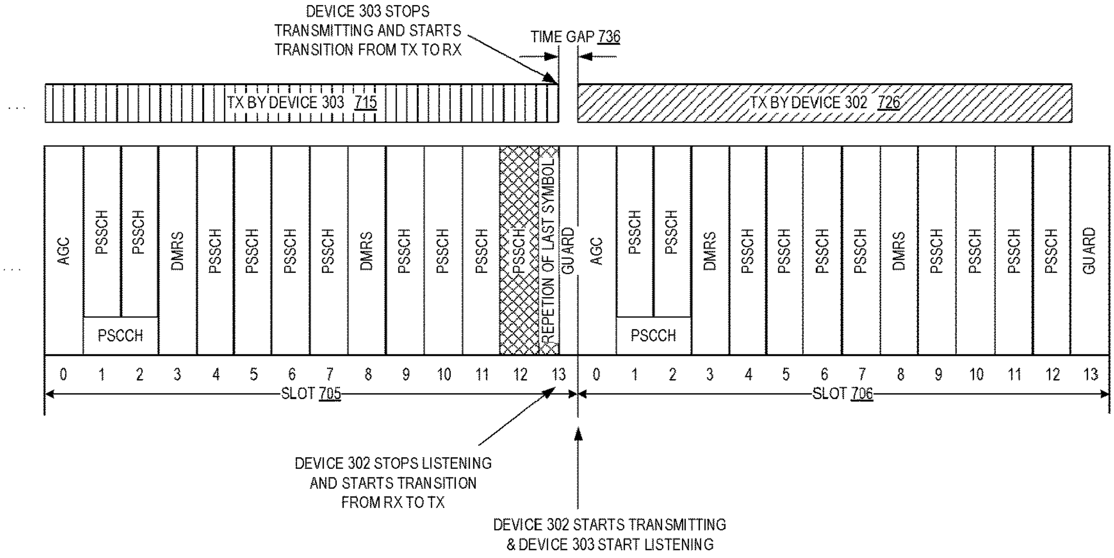

FIG. 7D shows an example of an extension of a transmission according to some example embodiments of the present disclosure. In this example, a COT is obtained by the device 301 and shared with the devices 302 and 303. The device 301 indicates that the device 303 will perform gap reduction for the device 302 by performing the extension of transmission in the COT or in one or more slots of the COT.

As shown in FIG. 7D, after several time slots from the initiating transmission performed by the device 301 (e.g., the transmission 712 in FIG. 7A or FIG. 7C) in the COT, at a slot 705, the device 303 may perform a transmission 715 in this slot 705. The device 303 may determine or be notified that a gap reduction is performed in the slot 705 because the device 302 will perform a transmission in a slot 706 following the slot 705. As such, the device 303 may extend the transmission 715 to a guard period of the slot 705. In some examples, the device 303 may transmit a repetition of the last symbol (e.g., PSSCH) in the extended transmission within the guard period.

The end point of the transmission 715 may be selected in the guard period of the slot 705 such that a time gap 736 from this point to a start point of the slot 706 is within a time gap limit for a target type of channel access procedure to be selected by the device 302. Then, the device 303 may stop transmitting and start transition from a TX mode to a RX mode at the end of the transmission 715.

The device 302 may stop listening and start transition from a RX mode to a TX mode at the end of the transmission 715. The device 302 may determine the size of the time gap 736 between the transmissions 715 and 726, and select a channel access procedure (i.e., a LBT Type 2B or 2C procedure) to be performed in the reduced time gap 736 for the transmission 726. The device 302 may then start transmitting and the device 303 may start listening at the start point of the slot 706.

Figure 7E:
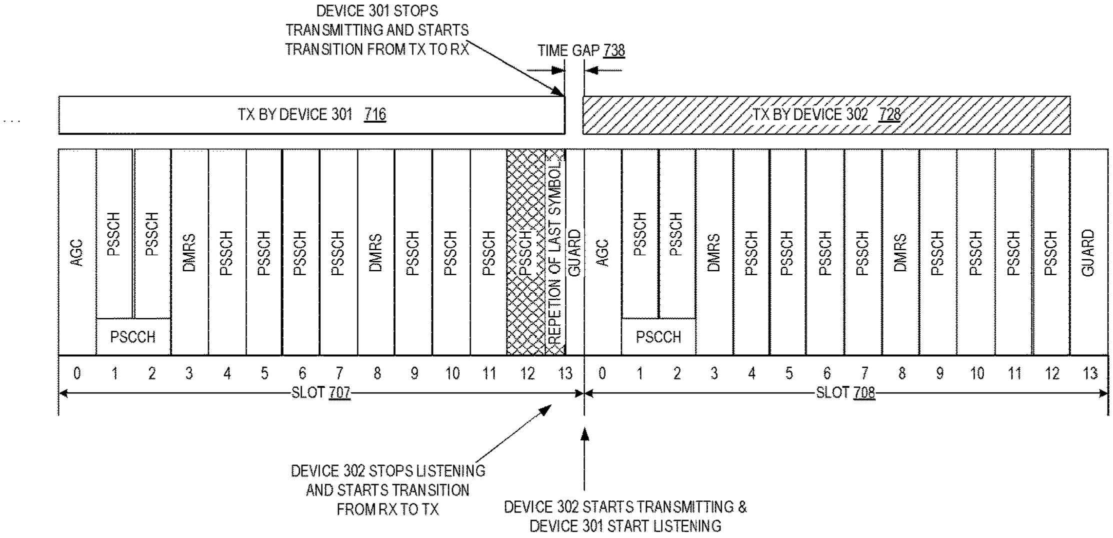
Figure 7F:
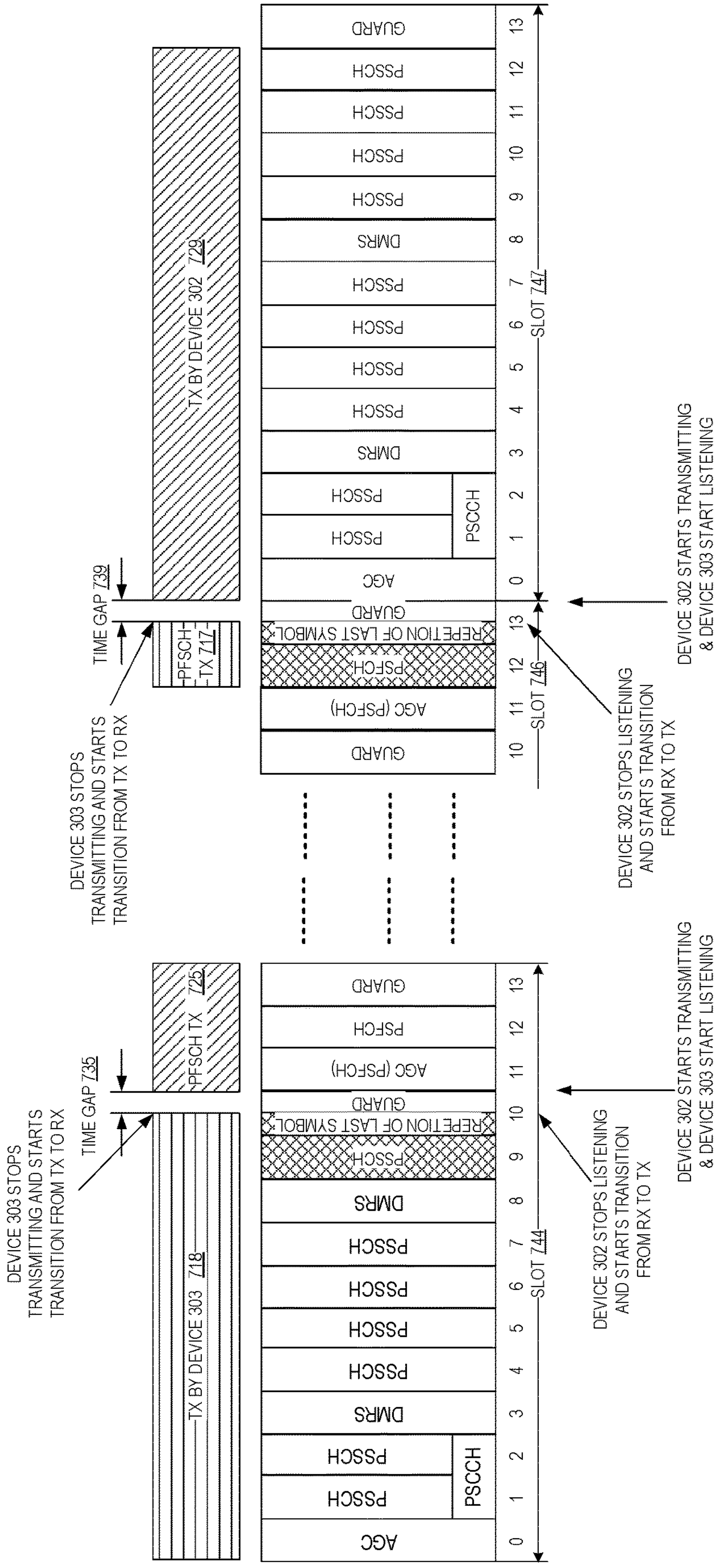

FIG. 7E shows an example of an extension of a transmission according to some example embodiments of the present disclosure. In this example, a COT is obtained by the device 301 and shared with at least the device 302. The device 301 is configured to perform extension of transmission for the device 302 in one or more slots after the beginning slots of the COT.

As shown in FIG. 7E, after several time slots from the initiating transmission performed by the device 301 (e.g., the transmission 712 in FIG. 7A or FIG. 7C) in the COT, at a slot 707, the device 301 may perform a transmission 715 in this slot 707. The device 301 may determine that a gap reduction is performed in the slot 705 because the device 302 will perform a transmission in a slot 708 following the slot 707. As such, the device 301 may extend the transmission 716 to a guard period of the slot 707. In some examples, the device 301 may transmit a repetition of the last symbol (e.g., PSSCH) in the extended transmission within the guard period.

The end point of the transmission 716 may be selected in the guard period of the slot 705 such that a time gap 738 from this point to a start point of the slot 708 is within a time gap limit for a target type of channel access procedure to be selected by the device 302. Then the device 301 may stop transmitting and start transition from a TX mode to a RX mode at the end of the transmission 716.

The device 302 may stop listening and start transition from a RX mode to a TX mode at the end of the transmission 716. The device 302 may determine the size of the time gap 736 between the transmissions 716 and 728, and select a channel access procedure (i.e., a LBT Type 2B or 2C procedure) to be performed in the reduced time gap 738 for the transmission 728. The device 302 may then start transmitting and the device 301 may start listening at the start point of the slot 708.

FIG. 7F shows an example of transmission for PSFCH according to some example embodiments of the present disclosure. In this example, a slot structure in slots 744 and 746 is different than those illustrated in FIGS. 7A-7E is provided, with two guard periods in Symbol 10 and Symbol 13. In this example, a COT is obtained by a device 301 and is shared with the devices 302 and 303. The device 303 is configured to perform an extension of a transmission so as to ensure a gap reduction for the device 302.

As illustrated in FIG. 7F, the device 303 performs a transmission 718 in the slot 744 and this transmission 718 is extended to a first guard period in Symbol 10 of the slot 744. The device 303 may stop transmitting and start transition from a TX mode to a RX mode at the end of the transmission 718. At the same time, the device 302 intends to perform a PSFCH transmission 725. As the guard period in Symbol 10 is partially used for transmission, a time gap between the end of the transmission 718 and a start point of the following Symbol 11 is reduced to support a transmission by the device 302. Thus, the device 302 may stop listening and start transition from a RX mode to a TX mode at the end of the transmission 718.

At the end point of the time gap 735, the device 302 may start transmitting a PSFCH transmission 725 and the device 303 may start listening. As illustrated by FIG. 7F, since the transmission 718 prior to the PSFCH transmission 725 is extended to the guard period of the slot 744, the gap time 735 may be reduced, for example, to be equal to or less than 16 μs. Thus, a LBT Type 2B or a LBT Type 2C procedure may be performed by the device 302 before the PSFCH transmission 725.

FIG. 7F further illustrates an example of extension of a PSFCH transmission. As shown in FIG. 7F, the device 302 intends to transmit a transmission 729 in a slot 747. In this case, the device 303 transmits a PSFCH transmission 717 in a slot 746 immediately prior to the slot 747. To reduce a time gap 739 between the PSFCH transmission 717 and the transmission 729 performed by the device 302, the device 303 may extend the PSFCH transmission 717 to a guard period in slot 746 of the slot 746. At the end of the PSFCH transmission 717, the device 303 may stop transmitting and start transition from a TX mode to a RX mode. The device 302 may stop listening and start transition from a RX mode to a TX mode at the end of the PFSCH transmission 717. At the end point of the time gap 739, the device 302 may start transmitting and the device 303 may start listening at the slot 747. By extending the PSFCH transmission 717, the time gap 739 may be reduced, for example, to be equal to or less than 16 μs. Thus, a LBT Type 2B or a LBT Type 2C procedure could be performed by the device 302 during the time gap 739.

Although the gap reduction aid for one device (e.g., the device 302) is discussed in the example embodiments above, in other example embodiments, one or more devices sharing the same COT may provide the gap reduction aid for more than one device in a similar way. The scope of the present disclosure is not limited in this regard.

Figure 8:
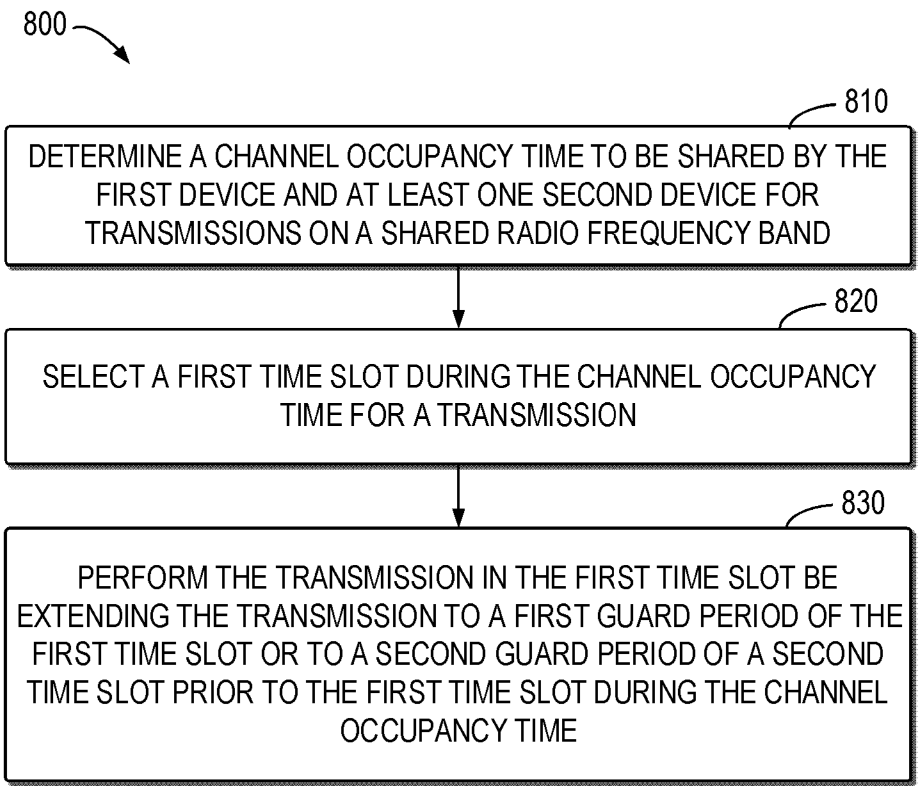
FIG. 8 illustrates a flowchart of a method implemented at a device according to some example embodiments of the present disclosure.

FIG. 8 shows a flowchart of an example method 800 implemented at a device in accordance with some example embodiments of the present disclosure. For the purpose of discussion, the method 800 will be described from the perspective of a first device, which may be the device 301 or 302 in FIG. 3 or FIG. 5, or a terminal device 110 in FIG. 1.

At block 810, the first device determines a COT to be shared by the first device and at least one second device for transmissions on a shared radio frequency band. At block 820, the terminal device 110 selects a first time slot during the COT for a transmission. At block 830, the first device performs the transmission in the first time slot by extending the transmission to a first guard period of the first time slot or to a second guard period of a second time slot prior to the first time slot during the channel occupancy time.

In some example embodiments, the first device performs the transmission by one of the following: extending an end point of the transmission towards a first point within the first guard period such that a first time gap between the first point and a start point of a following transmission is within a time gap limit for a type of channel access procedure, and extending a start point of the transmission towards a second point within the second guard period such that a second time gap between the second point and an end point of a preceding transmission performed in the second time slot is within the time gap limit.

In some example embodiments, the following transmission is determined to be performed by a second device of the at least one second device in a time slot following the first time slot during the channel occupancy time, and the first time gap enables the second device to perform the type of channel access procedure.

In some example embodiments, the type of channel access procedure comprises a Type 2B channel access procedure or a Type 2C channel access procedure.

In some example embodiments, the first device is a device initiating a channel access procedure to obtain the channel occupancy time, and the first device 110 performs the transmission by extending the transmission to the first guard period of the first time slot.

In some example embodiments, the first device determines that an extension of a transmission to a guard period of a time slot during the channel occupancy time is allowed based on at least one of the following: a resource configuration for the channel occupancy time indicating that the extension is allowed, a determination that the first device and a second device of the at least one second device are under a same synchronization source, a congestion level in the shared radio frequency band being above a congestion threshold, and a priority of a transmission to be performed by a second device of the at least one second device being higher than a priority threshold.

In some example embodiments, the first device transmits, to a second device of the at least one second device, at least one of the following: a first indication to indicate that an extension of a transmission to a guard period of a time slot during the channel occupancy time is enabled by the first device or by the second device, and a second indication to indicate that an extension of a transmission to a guard period of a time slot during the channel occupancy time is enabled in at least one time slot of the channel occupancy time.

In some example embodiments, the channel occupancy time is obtained by a second device of the at least one second device, and the first device is a device with which the second device shares the channel occupancy time. In some example embodiments, the first device performs the transmission by extending the transmission to the second guard period of the second time slot, to enable the first device to perform a transmission during the channel occupancy time through a type of the channel access procedure, or extending the transmission to the first guard period of the first time slot, to enable a further second device of the at least one second device to perform a transmission during the channel occupancy time through the type of the channel access procedure.

In some example embodiments, the first device receives, from the second device, at least one of the following: a first indication to indicate that an extension of a transmission to a guard period of a time slot during the channel occupancy time is enabled by the first device or by the second device; and a second indication to indicate that an extension of a transmission to a guard period of a time slot during the channel occupancy time is enabled in at least one time slot of the channel occupancy time.

In some example embodiments, the first device selects the first time slot by in accordance with a determination that a further transmission is to be performed by a second device of the at least one second device in a third time slot having a gap of at least one time slot from a preceding transmission performed during the channel occupancy time, select the first time slot immediately prior to the third time slot, and the first device 110 performs the transmission by performing a channel access procedure on the shared radio frequency band, and in accordance with a determination that the channel access procedure is successfully completed, performing the transmission for a partial duration of the first guard period of the first time slot.

In some example embodiments, the transmission comprises a transmission for a physical sidelink shared control channel or a transmission for a physical sidelink feedback control channel.

In some example embodiments, a first apparatus capable of performing any of the method 800 (for example, the device 301 or 302 in FIG. 3 or FIG. 5, or a terminal device 110 in FIG. 1) may comprise means for performing the respective operations of the method 800. The means may be implemented in any suitable form. For example, the means may be implemented in a circuitry or software module. The first apparatus may be implemented as or included in the device 301 or 302 in FIG. 3 or FIG. 5, or a terminal device 110 in FIG. 1.

In some example embodiments, the first apparatus comprises means for performing the transmission by one of the following: extending an end point of the transmission towards a first point within the first guard period such that a first time gap between the first point and a start point of a following transmission is within a time gap limit for a type of channel access procedure, and extending a start point of the transmission towards a second point within the second guard period such that a second time gap between the second point and an end point of a preceding transmission performed in the second time slot is within the time gap limit.

In some example embodiments, the following transmission is determined to be performed by a second apparatus of the at least one second apparatus in a time slot following the first time slot during the channel occupancy time, and the first time gap enables the second apparatus to perform the type of channel access procedure.

In some example embodiments, the type of channel access procedure comprises a Type 2B channel access procedure or a Type 2C channel access procedure.

In some example embodiments, the first apparatus is an apparatus initiating a channel access procedure to obtain the channel occupancy time, and the means for performing the transmission comprises means for performing the transmission by extending the transmission to the first guard period of the first time slot.

In some example embodiments, the first apparatus further comprises means for determining that an extension of a transmission to a guard period of a time slot during the channel occupancy time is allowed based on at least one of the following: a resource configuration for the channel occupancy time indicating that the extension is allowed, a determination that the first apparatus and a second apparatus of the at least one second apparatus are under a same synchronization source, a congestion level in the shared radio frequency band being above a congestion threshold, and a priority of a transmission to be performed by a second device of the at least one second apparatus being higher than a priority threshold.

In some example embodiments, the first apparatus further comprises means for transmitting, to a second apparatus of the at least one second apparatus, at least one of the following: a first indication to indicate that an extension of a transmission to a guard period of a time slot during the channel occupancy time is enabled by the first apparatus or by the second apparatus, and a second indication to indicate that an extension of a transmission to a guard period of a time slot during the channel occupancy time is enabled in at least one time slot of the channel occupancy time.

In some example embodiments, the channel occupancy time is obtained by a second apparatus of the at least one second apparatus. In some example embodiments, the first apparatus is an apparatus with which the second apparatus shares the channel occupancy time. In some example embodiments, the means for performing the transmission comprises means for performing the transmission by extending the transmission to the second guard period of the second time slot, to enable the first apparatus to perform a transmission during the channel occupancy time through a type of the channel access procedure, or extending the transmission to the first guard period of the first time slot, to enable a further second apparatus of the at least one apparatus to perform a transmission during the channel occupancy time through a type of the channel access procedure.

In some example embodiments, the first apparatus further comprises means for receiving, from the second apparatus, at least one of the following: a first indication to indicate that an extension of a transmission to a guard period of a time slot during the channel occupancy time is enabled by the first apparatus or by the second apparatus; and a second indication to indicate that an extension of a transmission to a guard period of a time slot during the channel occupancy time is enabled in at least one time slot of the channel occupancy time.

In some example embodiments, the means for selecting the first time slot comprises means for selecting the first time slot by in accordance with a determination that a further transmission is to be performed by a second apparatus of the at least one second apparatus in a third time slot having a gap of at least one time slot from a preceding transmission performed during the channel occupancy time, select the first time slot immediately prior to the third time slot. In some example embodiments, the means for performing the transmission comprises means for performing the transmission by performing a channel access procedure on the shared radio frequency band, and in accordance with a determination that the channel access procedure is successfully completed, performing the transmission for a partial duration of the first guard period of the first time slot.

In some example embodiments, the transmission comprises a transmission for a physical sidelink shared control channel or a transmission for a physical sidelink feedback control channel.

FIG. 9 is a simplified block diagram of a device 900 that is suitable for implementing example embodiments of the present disclosure. The device 900 may be provided to implement a communication device, for example, the terminal device 110 or the network device 120 as shown in FIG. 1, or the device 301, 302, or 303 as shown in FIG. 3 or FIG. 5. As shown, the device 900 includes one or more processors 910, one or more memories 920 coupled to the processor 910, and one or more communication modules 940 coupled to the processor 910.

The communication module 940 is for bidirectional communications. The communication module 940 has one or more communication interfaces to facilitate communication with one or more other modules or devices. The communication interfaces may represent any interface that is necessary for communication with other network elements. In some example embodiments, the communication module 940 may include at least one antenna.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the memory, e.g., ROM 924. The processor 910 may perform any suitable actions and processing by loading the program 930 into the RAM 922.

The example embodiments of the present disclosure may be implemented by means of the program 930 so that the device 900 may perform any process of the disclosure as discussed with reference to FIGS. 3 to 8. The example embodiments of the present disclosure may also be implemented by hardware or by a combination of software and hardware.

In some example embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 which may be in form of CD, DVD or other optical storage disk. The computer readable medium has the program 930 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIG. 4 and FIG. 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:

at least one processor; and at least one memory including computer program code;

wherein the at least one memory and the computer program code are configured to, with the at least one processor, cause the first device to:

determine a channel occupancy time to be shared by the first device and at least one second device for transmissions on a shared radio frequency band;

select a first time slot during the channel occupancy time for a transmission;

perform the transmission in the first time slot by extending the transmission to a first guard period of the first time slot or to a second guard period of a second time slot prior to the first time slot during the channel occupancy time;

extend an end point of the transmission towards a first point within the first guard period such that a first time gap between the first point and a start point of a following transmission is within a time gap limit for a type of channel access procedure;

extend a start point of the transmission towards a second point within the second guard period such that a second time gap between the second point and an end point of a preceding transmission is within the time gap limit;

perform the transmission by extending the transmission to the first guard period of the first time slot;

determine that an extension of a transmission to a guard period of a time slot during the channel occupancy time is allowed based on: a resource configuration for the channel occupancy time indicating that the extension is allowed; a determination that the first device and a second device of the at least one second device are under a same synchronization source; a congestion level in the shared radio frequency band being above a congestion threshold; and a priority of the transmission to be performed by the second device of the at least one second device being higher than a priority threshold;

transmit, to a second device of the at least one second device, a first indication to indicate that an extension of a transmission to a guard period of a time slot during the channel occupancy time is enabled by the first device or by the second device; and a second indication to indicate that the extension of the transmission to the guard period of the time slot during the channel occupancy time is enabled in at least one time slot of the channel occupancy time;

extend the transmission to the second guard period of the second time slot, to enable the first device to perform a transmission during the channel occupancy time through a type of the channel access procedure;

extend the transmission to the first guard period of the first time slot, to enable a further second device of the at least one second device to perform a transmission during the channel occupancy time through the type of the channel access procedure;

receive, from the second device, a first indication to indicate that an extension of a transmission to a guard period of a time slot during the channel occupancy time is enabled by the first device or by the second device, and a second indication to indicate that the extension of the transmission to the guard period of the time slot during the channel occupancy time is enabled in at least one time slot of the channel occupancy time;

in accordance with a determination that a further transmission is to be performed by a second device of the at least one second device in a third time slot having a gap of at least one time slot from a preceding transmission performed during the channel occupancy time, select the first time slot immediately prior to the third time slot;

perform a channel access procedure on the shared radio frequency band;

in accordance with a determination that the channel access procedure is successfully completed, perform the transmission for a partial duration of the first guard period of the first time slot; and transmit the transmission for the partial duration of the first guard period starting at a start point of the first guard period, wherein the following transmission is determined to be performed by a second device of the at least one second device in a time slot following the first time slot during the channel occupancy time, and the first time gap enables the second device to perform the type of channel access procedure, wherein the type of channel access procedure comprises a Type 2B channel access procedure or a Type 2C channel access procedure, wherein the first device is a device initiating a channel access procedure to obtain the channel occupancy time, wherein the channel occupancy time is obtained by a second device of the at least one second device, and the first device is a device with which the second device shares the channel occupancy time, wherein the transmission comprises a transmission for a physical sidelink shared control channel or a transmission for a physical sidelink feedback control channel, wherein the first indication comprises a single bit indicating that extension of a transmission to a guard period is enabled, wherein the second indication comprises a bitmap of slots and symbols within the channel occupancy time indicating one or more specific slots or symbols in which extension is enabled, wherein the first indication and the second indication are transmitted via physical layer signaling comprising second stage sidelink control information, wherein the channel access procedure performed before the transmission for the partial duration of the first guard period comprises a Type 2A channel access procedure, wherein the transmission for the partial duration of the first guard period comprises a sub-symbol transmission, wherein the transmission for the partial duration of the first guard period comprises a gap reduction beacon or a physical sidelink feedback control channel transmission, and wherein the channel occupancy time is obtained by a third device and shared with the first device and the at least one second device, and the transmission performed by the first device in the first time slot is extended to the first guard period of the first time slot such that a time gap between the transmission and a following transmission by a second device of the at least one second device in a following time slot is within a time gap limit for the type of channel access procedure.

* * * * *